United States Patent [19]

Johnson

[11] 4,037,831
[45] July 26, 1977

[54] CUTTER HOLD DOWN APPARATUS

[76] Inventor: Harold O. Johnson, 1163 D St., Springfield, Oreg. 97477

[21] Appl. No.: 706,538

[22] Filed: July 19, 1976

[51] Int. Cl.² .............................................. B23Q 3/18
[52] U.S. Cl. ................................... 269/306; 269/319; 83/467 R
[58] Field of Search .................................. 83/447–450, 83/420, 422, 467; 209/306, 315–319

[56] References Cited

U.S. PATENT DOCUMENTS

| 363,016 | 5/1887 | Stalter | 83/449 |
| 2,038,770 | 4/1936 | Straeten | 83/422 |

Primary Examiner—James L. Jones, Jr.
Assistant Examiner—Robert C. Watson
Attorney, Agent, or Firm—James D. Givnan, Jr.

[57] ABSTRACT

The hold down apparatus includes cooperating adjustable fences confining a workpiece for travel past a rotary cutter. A hold down assembly of the apparatus includes wheel members carried by a vertically adjustable crossmember. The crossmember is biased by multiple springs with the spring rate being variable by threaded components. A screw shaft additionally permits precise vertical adjustment of the hold down means. A rearwardly off set hold down wheel prevents tipping of lengthy workpieces. The fences have recessed areas to allow positioning closely adjacent and inwardly past the hold down devices.

6 Claims, 4 Drawing Figures

CUTTER HOLD DOWN APPARATUS

BACKGROUND OF THE INVENTION

The present invention is concerned with an apparatus for guiding a workpiece as it moves over a rotating cutter.

Well known in the prior art are fence devices along which a workpiece travels over a supporting surface into contact with a cutter such as a dado blade or planer head. The primary objective of such devices is to avoid the risk of injury encountered when the worker manually confines the workpiece for travel along the machine bed or table. Generally, such devices include a roller or wheels positioned above the machine table in an adjustable manner to receive various workpiece thicknesses and confine same for travel past the rotating cutting tool. Normally, the wheels or rollers cooperate with a table mounted fence the latter preventing lateral shifting of the workpiece in one direction. Such fences are standard equipment on conventional tools of the present type. Also found in the prior art is the concept of spring urging hold down rolls or wheels to bias the workpiece against the cutter.

SUMMARY OF THE PRESENT INVENTION

The present invention is embodied within a device for securement to the bed or table of a machine for the purpose of confining a moving workpiece of various cross sectional dimensions against any vertical or lateral displacement during a cutting operation.

The present apparatus includes a framework for securement to the saw table. Spaced inwardly from the sides of the framework are a pair of workpiece fences which may be adjusted so as to oppositely confine the workpiece against lateral displacement. The framework slidably receives rod members coupled with the fences which may be locked in place so as to retain the fences where positioned. The cooperating fences each include the wood portion to protect the cutter in case of momentary contact therein. Said framework additionally includes a hold down assembly including a movable crossmember which carries front hold down wheels with the crossmember being yieldably mounted for vertical movement within the framework. Depending from the framework are a pair of crossmember supports each of which includes an adjustable spring component to permit varying of the biasing action of the hold down wheels on the workpiece. A rearwardly spaced hold down wheel additionally rides on the workpiece in biased engagement therewith to prevent tipping of the workpiece.

Important objectives of the present invention include the provision of a hold down apparatus which confines the workpiece for travel past a saw blade in a manner dispensing with the manual hold down effort and thereby precluding risk of injury to the worker; the provision of a hold down apparatus including a pair of side fences adjustable toward and away from the cutter element to permit confinement of a workpiece therebetween during cutting; the provision of a hold down apparatus including hold down wheels carried by a crossmember which in turn is biased by multiple spring assemblies to urge the wheels into workpiece contact; the provision of a hold down apparatus including a rearwardly spaced hold down wheel to exert a hold down action against sawn material to prevent tipping of same. Additional objectives will become subsequently apparent.

DETAILED DESCRIPTION OF THE PREFERRED EMBODIMENT

Figure 1:
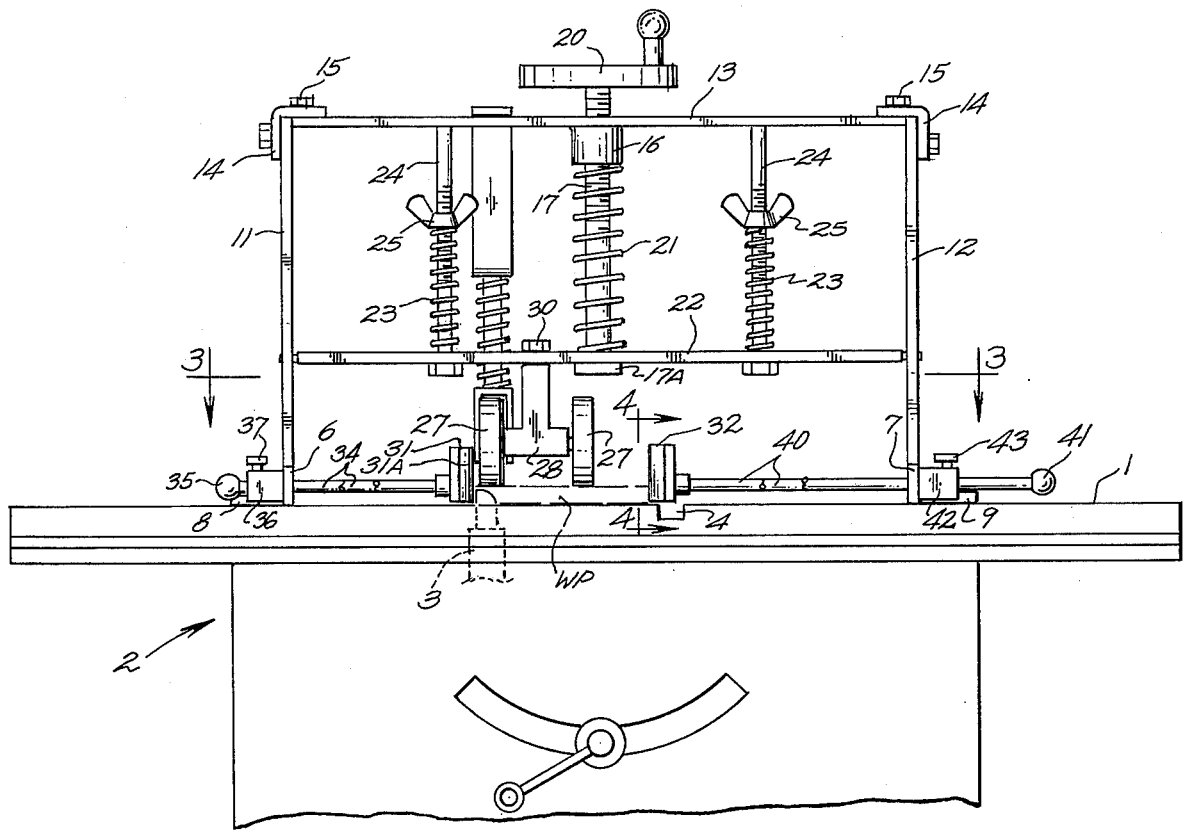
FIG. 1 is a front elevational view of a bench saw with the present apparatus in place thereon.
Figure 2:
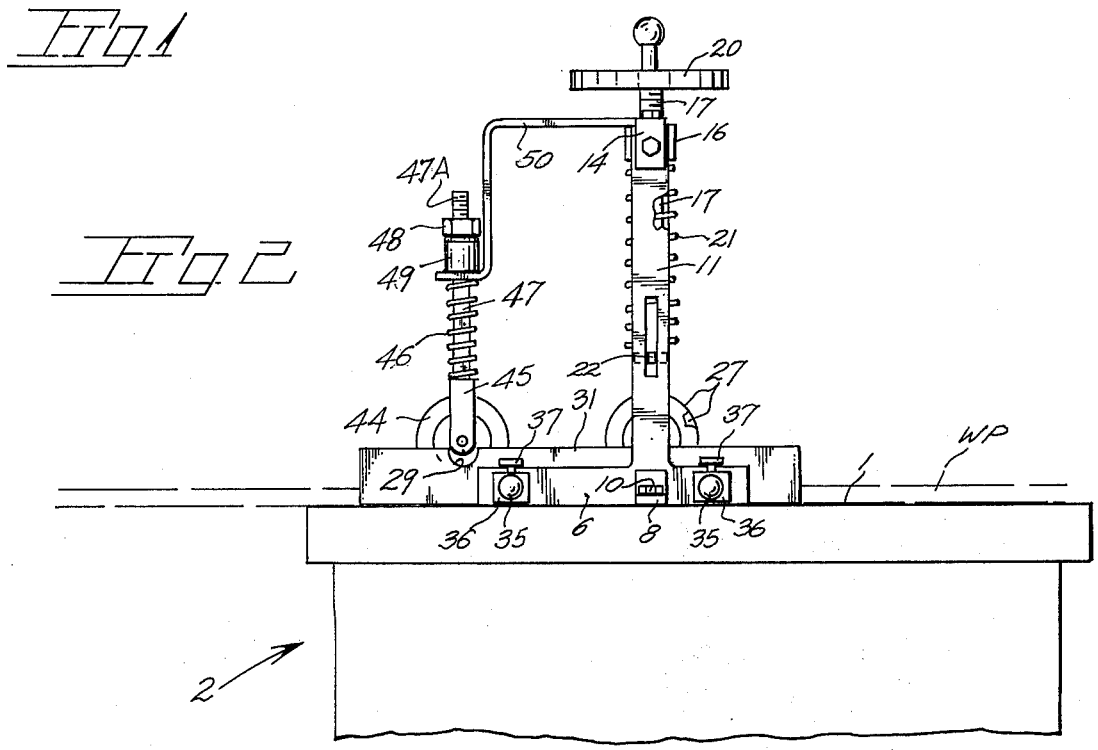
FIG. 2 is a left hand side elevational view of FIG. 1.
Figure 3:
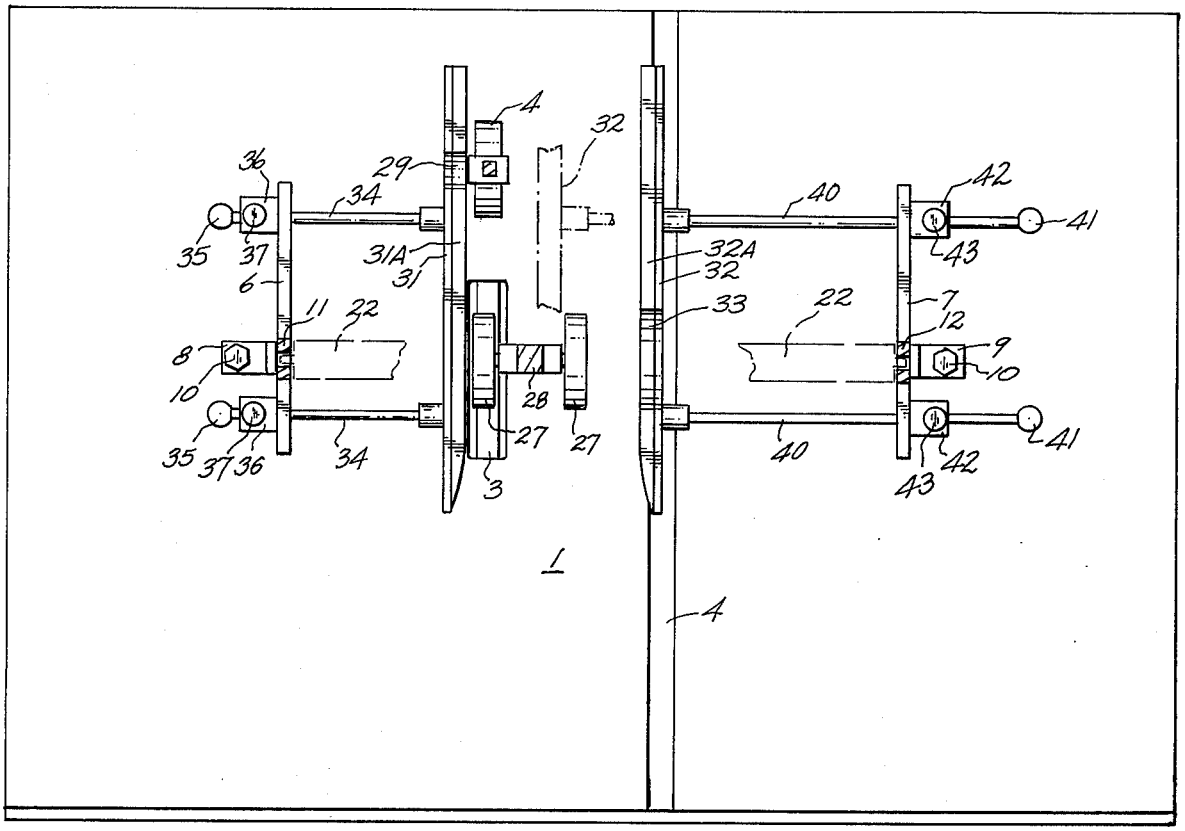
FIG. 3 is a sectional view of the present apparatus taken downwardly along line 3—3 fo FIG. 1.
Figure 4:
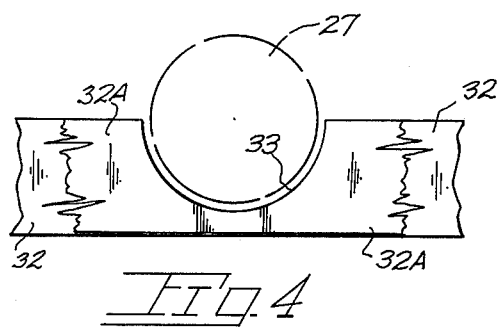
FIG. 4 is an elevational view taken along line 4—4 of FIG. 1.

With continuing attention to the drawings wherein applied reference numerals indicate parts similarly identified in the following description, the reference numeral 1, indicates the table portion of a bench saw indicated generally at 2. A cutter is indicated at 3 with the saw including the typical arrangement for inclining the cutter to the table 1. The table 1 includes a groove 4 for the reception of a mitre gauge which has been removed. While a bench saw is shown it is to be understood that the present apparatus is usable with other machines having rotatable cutting elements.

The present apparatus includes a framework comprising parallel side members at 6 and 7 each provided with a cleat at 8 and 9 which receive fasteners 10 securing the apparatus to table 1. The framework further includes an arch consisting of upright members 11 and 12 interconnected at their upper ends by a cross piece 13. Angles at 14 interconnect the uprights with cross piece 13 in a manner permitting disassembly upon the removal of fasteners 15 enabling convenient servicing of the apparatus.

Secured to cross piece 13 is an internally threaded collar 16 within which is received a crossmember supporting screw shaft 17 provided at its upper end with a hand crank 20 of a hold down assembly. A helical spring 21 is circumposed about shaft 17 and exerts a downwardly directed, biasing action on a crossmember 22 extending intermediate the uprights 12 of the framework arch. The lower end of shaft 17 is enlarged at 17A to support crossmember 22.

Additionally biasing crossmember 22 in a downward direction are a pair of helical springs 23 each carried by a threaded support 24 provided with a wing nut 25 which permits the loading of springs 23 and crossmember 22 to be varied. The upper ends of shafts 24 are secured in place on cross piece 13. Crossmember 22 carries hold down means at 27 shown as being a pair of wheels having a common support 28 the latter being secured to crossmember 22 by a fastener element 30.

From the foregoing description it will be seen that rotation of hand wheel 20 will raise or lower crossmember 22 and hence hold down means 27 carried thereby to position same for biased contact with the upper surface of the workpiece indicated at WP. Further, the resistance of hold down means 27 to upper displacement by the workpiece may be adjusted by varying the compression of springs 23 via the adjustment of wing nuts 25.

For purposes of confining the workpiece WP for linear travel past a cutter 3 I provide cooperating, fences 31 and 32 each outwardly curved at its forward end to facilitate workpiece reception. Each fence preferably includes a wooden component 31A—32A to provide a non-injurious surface in case of fence contact with the saw blade. Fence 31 is provided with a cutout 29 to permit positioning of the fence close to a later described anti-tipping wheel. Fence 32 is also recessed at 33 to permit passage of same inwardly below hold down means 27 to confine a workpiece of narrow widths.

Fence 31 is coupled to the apparatus framework by slide means 34 shown as rods which terminate outwardly in pulls 35. Slide blocks 36 on the framework include locks 37 engageable with a rod to lock same in place. Similarly, the remaining fence 32 is coupled to the framework by slide means shown as rods 40 provided at their outer ends with pulls 41 with said rods extending through slide blocks 42 each equipped with a lock 43. Accordingly, fences 31 and 32 may be laterally adjusted relative to cutter 3 to confine workpiece WP for travel therepast.

Rearwardly spaced from hold down means 27, shown as a pair of wheels, is an auxiliary hold down wheel at 44 within a wheel bracket 45 biased downwardly by a spring 46 circumposed about a squared shaft 47. Wheel 44 confines lengthy workpieces against tipping. The upper end of shaft 47 is threaded at 47A to receive an adjustment nut 48 which acts against a collar 49 affixed to an angulated support 50 which, in turn, is carried by crosspiece 13.

In use, the fences 31 and 32 are adjusted inwardly to abut the workpiece edges with fence 32 positionable inwardly past hold down wheel 27 if necessary for workpiece abutment. Hold down means 27 is precisely located to lightly contact the workpiece upper surface by rotation of handwheel 20. Depending upon the nature of the material being cut, the rate of springs 23 will be adjusted by wing nuts 25 to confine carrier crossmember 22 against upward displacement during a cutting operation.

The hold down apparatus is particularly suited for use in the production of moulding, framing and coving but may well be used in conjunction with a circular saw blade.

While I have shown but one embodiment of the invention it will be apparent to those skilled in the art that the invention may be embodied still otherwise without departing from the spirit and scope of the invention claimed.

I claim:

1. An apparatus for attachment to the table of a bench saw or the like for confining workpieces of different thicknesses for travel past a rotatable cutter, said apparatus comprising,
   a framework for attachment to the saw table and including table mounted members and an arch extending therebetween,
   opposed fences inwardly of said table mounted members and laterally spaced from the cutter,
   means adjustably coupling said fences to the table mounted members, and
   a hold down assembly including hold down means for contact with the upper surface of the workpiece, a movable crossmember extending intermediate upright members of the framework arch and carrying said hold down means, crossmember supports on said arch, one of said crossmember supports adjustably mounted on said arch whereby the hold down means may be positioned to accomodate workpieces of different thicknesses, spring members carried by at least some of said crossmember supports and acting on the crossmember to downwardly bias the hold down means carried thereby into workpiece contact to restrain same against upward displacement, adjustable means on some of said crossmember supports and positionable therealong to vary the rate of said spring members and hence the biasing force exerted thereby on said crossmember and on said hold down means.

2. The apparatus claimed in claim 1 wherein said crossmember of the hold down assembly is in sliding engagement at its ends with the upright members of the framework arch.

3. The apparatus claimed in claim 1 wherein said table mounted members include locking means engageable with said coupling means to retain said fences in place during saw operation.

4. The apparatus claimed in claim 3 wherein said fences include non-metallic members.

5. The apparatus claimed in claim 1 wherein at least one of said fences defines a recess within its upper edge to permit inward passage of said one fence below said hold down means and into restraining contact with a workpiece edge.

6. The apparatus claimed in claim 1 additionally including auxiliary hold down means carried in an offset manner by said framework for biased contact with the workpiece at a point spaced in the direction of workpiece travel from the first mentioned hold down means, said auxiliary hold down means including a spring member for downwardly biasing a workpiece contacting member of the auxiliary hold down means.

* * * * *